US009264786B2

(12) United States Patent
Lichoulas et al.

(10) Patent No.: US 9,264,786 B2
(45) Date of Patent: Feb. 16, 2016

(54) METHOD AND APPARATUS FOR UNIVERSAL XDSL DEMARCATION INTERFACE WITH MULTI-FUNCTIONAL CAPABILITY AND SIGNAL PERFORMANCE ENHANCEMENT

(75) Inventors: Ted Lichoulas, Simpsonville, SC (US); Eddie Kimbrell, Dacula, GA (US); David Halverson, Moore, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 12/675,023

(22) PCT Filed: Jul. 17, 2009

(86) PCT No.: PCT/US2009/051013
§ 371 (c)(1),
(2), (4) Date: Feb. 24, 2010

(87) PCT Pub. No.: WO2010/009408
PCT Pub. Date: Jan. 21, 2010

(65) Prior Publication Data
US 2011/0134937 A1    Jun. 9, 2011

Related U.S. Application Data

(60) Provisional application No. 61/081,430, filed on Jul. 17, 2008, provisional application No. 61/142,417, filed on Jan. 5, 2009.

(51) Int. Cl.
*H04L 12/66*      (2006.01)
*H04Q 1/02*       (2006.01)

(52) U.S. Cl.
CPC . *H04Q 1/028* (2013.01); *H04Q 1/03* (2013.01)

(58) Field of Classification Search
USPC .................. 370/463; 379/413.02–413.04
See application file for complete search history.

(56) References Cited

U.S. PATENT DOCUMENTS

| 6,026,160 | A  | * | 2/2000  | Staber et al. ............. 379/413.03 |
| 6,738,474 | B1 | * | 5/2004  | Miller ....................... 379/413.03 |
| 7,742,397 | B2 | * | 6/2010  | Kennedy ................ H04Q 1/028 370/216 |
| 8,325,494 | B2 | * | 12/2012 | Kimbrell .................. H04Q 1/02 361/803 |
| 2003/0063659 | A1 |   | 4/2003  | Kaltiainen et al. |
| 2007/0160193 | A1 | * | 7/2007  | Vo et al. .................... 379/413.02 |
| 2010/0097747 | A1 | * | 4/2010  | Wang et al. .............. 361/679.01 |

* cited by examiner

*Primary Examiner* — Yemane Mesfin
*Assistant Examiner* — Mon Cheri Davenport
(74) *Attorney, Agent, or Firm* — Sughrue Mion, PLLC

(57) ABSTRACT

Provided is a network module, the module including a base unit, wherein the base unit includes at least one mating element that couples to a corresponding mating element of a network interface device; at least one connector element that couples to an add-on module; and the add-on module, wherein the add-on module includes at least one mating element corresponding to the connector element of the base unit, wherein the base unit is configured to interface with the add-on module and wherein the base unit is electrically connected to the add-on module.

17 Claims, 15 Drawing Sheets

(a)

(b)

(a)

(b)

(a)

(b)

(a)

(b)

METHOD AND APPARATUS FOR UNIVERSAL XDSL DEMARCATION INTERFACE WITH MULTI-FUNCTIONAL CAPABILITY AND SIGNAL PERFORMANCE ENHANCEMENT

CROSS-REFERENCE TO RELATED APPLICATIONS

This application is a Section 371 National Stage of Patent Cooperation Treaty Application No. PCT/US2009/051013 filed on Aug. 17, 2009, which is a non-provisional of Patent Cooperation Treaty Application No. PCT/US2009/002489 filed on Apr. 22, 2009, which claims priority from U.S. Provisional Patent Application No. 61/046,825 filed Apr. 22, 2008 the disclosures of which are incorporated herein by reference in their entirety. This application also claims priority from U.S. Provisional Patent Applications No. 61/081,430, filed Jul. 17, 2008; and No. 61/142,417, filed Jan. 5, 2009, in the United States Patent and Trademark Office, the disclosures of which are incorporated herein by reference in their entirety.

BACKGROUND

1. Field of the Invention

Methods and apparatuses consistent with the present invention relate to the selection of a Digital Subscriber Line (DSL) scheme from among all DSL schemes, profiles, and combinations, collectively referred to as xDSL; implementation of filtering and other signal enhancements of an xDSL signal; and universal demarcation physical interconnect of xDSL within all common Network Interface Devices (NIDs).

2. Description of the Related Art

A demarcation point, referred to as a network interface device (NID), is typically provided between a telephone subscriber's premises line and an incoming line from a telephone service provider, and is commonly mounted to a pole or outside wall of the subscriber's premises. However, a demarcation point may also be located, for example, at a wall plate of a distribution panel within a communications room on the ground floor of a Multi Dwelling Unit (MDU).

The NID enclosure can include a base section that is secured to a subscriber's premises, and to which a telephone subscriber line module is affixed. An interface device or module, typically mounted within an NID for physically connecting a telephone subscriber line with a telephone service provider line, is referred to as a "subscriber line module" or "subscriber bridge." Telephone service provider lines enter the NID enclosure and are connected to the telephone line of a subscriber's premises via a subscriber line module.

With the advent of a digital subscriber line (DSL) and very high speed DSL (VDSL) services, the telephone subscriber may have multiple services, such as telephone, Internet, or cable television, supplied on a single line or cable from the telephone company. In these situations, the NID becomes more complex in that it must contain circuitry to separate the signals of different frequencies coming in from the telephone company on a single line into signals for the subscriber's telephone, television, and Internet signals.

A variety of related art interface modules are available to meet these needs. These modules are usually of a standard shape that "snap" into the NID enclosure. However, as the number of interface modules in an NID enclosure becomes larger, for example, when a larger number of connections are needed to provide multiple services, the wiring inside the NID can become unwieldy.

Likewise, the interface modules and NIDs are sold by many different manufacturers. Accordingly, these modules may have different physical footprints and may not be easily adaptable to interact with other modules or the NID. For example, interface modules and NIDs are available with AFL Keptel or "K" footprint, AFL Seicor or "S" footprint, Tyco "K" footprint, Tyco "S" footprint, Corning Cable Systems "S" footprint, and Corning Cable Systems "Universal" footprint. Each type requires an interconnect scheme and splitter module of different physical shape.

Also, many service providers have deployed three-line space NIDs and have populated these NIDs with two line modules or interface module which occupy two line spaces in order to provide telecommunications service. Related art interface modules require at least two line spaces, thereby reducing the number of line spaces available for additional services or for future expansion. However, related art technology does not provide the capability for expansion of features or customization as part of an interface module. For example, adding a balanced two (2) wire differential circuit conversion to an unbalanced coaxial single-ended circuit would require installing a completely new device. Related art modules are either a stand alone splitter-filter module or a combination splitter-filter-balun module. These modules are not field upgradeable and must be replaced at considerable expense both in parts and skilled labor if, for example, the profile filtering or output connectivity required adjustment, re-configuration or replacement. Another option is to replace the NID itself with a larger unit, which is also expensive and inefficient.

Related art interface modules do not provide a way to attach auxiliary modules within one line space, that may be required for the addition of associated hardware, mechanical network system customization, security features. For example, related art splitter modules do not provide an add-on means to use alternate connector types. Instead, several specific splitter modules have been developed that employ the coaxial "F" connector style.

In addition, related art splitter modules are not mechanically or electrically modular in nature. Therefore, they do not allow for field configuration of xDSL profile filtering, system enhancements, or interconnect variations, while taking up only a single line space in the NID.

The vast majority of related art splitter-filter modules employ screw terminals to make connections at the demarcation point, requiring special tools, extra labor by skilled technicians and occupying excess space within the NID.

xDSL splitter, filter and signal conditioning devices may also be located at the NID interconnect point. xDSL refers collectively to data transmission methods such as, ADSL, ADSL2, ADSL2+, VDSL, VDSL2 and SHDSL, as described in ITU-T G.993.2, G.992.1, G.992.3, G.992.5, G.993.1, and G.991.2, which are hereby incorporated by reference in their entirety.

xDSL profiles relate to specific frequency plans, power spectral density (PSD), modulation schemes, noise mitigation techniques, and data rates for transmission of data within a POTS system employing an unshielded twisted pair (UTP) wire, but are not limited to this transmission medium and are, on occasion, deployed using coaxial cable (COAX), multi-pair Ethernet cable or a combination of media.

Over the years a variety of NID enclosures have been fielded with each model having differing physical configurations and orientations. In response, a very large number of physically different xDSL devices have been created to fit within a specific NID model. Additionally, each device created for a specific model has several versions to support each xDSL profile, and each of these devices has associated enhancement modules. Thus, a large number of physically different xDSL devices are required to support the many NID installations currently deployed in the field.

With respect to splitter modules, related art splitter-filters are only matched to one xDSL profile, are constructed as a single fixed dual slot unit (i.e. consume 2 line spaces within an NID), and cannot accommodate reconfigurations or add-on enhancements. Thus, as the xDSL system develops or is modified to use an additional xDSL profile, the related art splitter modules must be physically replaced with a second module matched to the second xDSL profile. The need for multiple xDSL splitters, each matched to a specific xDSL profile as well as the NID significantly increases the cost of operating and maintaining an xDSL system.

SUMMARY

Aspects of the present invention provide a circuit assembly that can be easily matched to a specific xDSL profile with the insertion of a xDSL profile add-on module into the assembly, or by remote activation of profile selection switches or the like. Also, a further selection of the data interface type and physical interconnect method is accommodated.

According to another aspect of the present invention, there is an apparatus for splitting an input signal, the apparatus including a xDSL profile filter for filtering a first sub-signal from the input signal, the first sub-signal according to a xDSL profile, and outputting a xDSL profile output signal; a voice-band filter for filtering a second sub-signal from the input signal, the second sub-signal according to a voice frequency band, and outputting a voice-band output signal; and a user interface for selecting a xDSL profile mode.

According to one aspect of the present invention, the xDSL profile mode may be consistent with one of a plurality of xDSL profiles, and the xDSL profile filter may filter the first sub-signal according to the xDSL profile mode.

According to another aspect of the present invention, the xDSL profile filter may include a plurality of cascaded filters corresponding to the plurality of xDSL profiles, and the xDSL profile filter may enable a filter of the plurality of cascaded filters corresponding to the selected xDSL profile mode and may disable the filters of the plurality of filters corresponding to the unselected xDSL profile modes.

The apparatus for splitting an input signal, in accordance with one aspect of the present invention, may further include a Public Switched Telephone Network (PSTN) twisted pair interconnect terminal for receiving the input signal; a data output wiring interconnect for providing the xDSL profile output signal; and a plain-old telephone service wiring interconnect for providing the voice-band output signal.

The apparatus for splitting an input signal may further include a surge protection device connected to the PSTN twisted pair.

One example of an embodiment of the present invention electrically partitions the various ITU-T reference models such that performance and signal integrity are maintained within the xDSL system while, at the same time, provides a way of using a base unit occupying a one-line space single slot, with optional add-on modules and adapter assembly, thus allowing this combination to be deployed in any variety of fielded NID enclosures.

In accordance with an aspect of the present invention, one portion of an xDSL system is a splitter composed of a related art low pass voice-band filter, a high pass or band pass data filter matched to the specific xDSL profile, and other signal enhancement, noise mitigation, and signal conversion techniques. Additionally, in order to more easily provide multiple services to a customer, it is important for the modules of an xDSL system to encompass a reduced amount of space within the NID. Therefore, an aspect of the present invention is to provide a base module and an add-on module that collectively function as a splitter-filter or splitter-filter-balun, but provide a modular design that can be easily interchanged to match a specific xDSL profile while being arranged within a single line 401 of an NID as shown in FIG. 15. Examples of embodiments of the present invention occupy only a single line slot 401 within the NID. Accordingly, smaller limited slot NID enclosures can be upgraded to xDSL without replacement of the NID, providing a significant cost and labor advantage.

One example of an embodiment of the present invention is predicated on a field configurable single slot Base Unit splitter that serves as a basic "building block" splitter-filter module that is mechanically and electrically modularized to allow for simple and easy configuration in the field. This modularized concept can also include, but is not limited to, balun and other signal enhancement technology as well as all xDSL profile filtering. Also, this modularized concept can be used to accommodate signal connectivity, primarily at a customer premise, to interconnect or intra-connect any variety of amplifiers, wireless, Fiber Optic, HDTV and other current and future communications medium.

The base unit provides screw bosses on the outside of the base unit as well as anti-rotation features to facilitate the mounting of auxiliary components such as, but not limited to, brackets for the attachment of said components as well as security features or other suitable components. Brackets and strain relief components may be used to prevent accidental dis-mate of the network connections while the NID is being serviced by provider personnel as well as discourage/prevent others from tampering with the existing connections.

Base unit and universal bracket in accordance with exemplary embodiments of the present invention allow flat surface as well as sub-surface "deep well" NID enclosure mounting and will fit AFL, Corning Cable Systems, and Tyco, K, S and Universal NID footprints.

In one embodiment, the add-on module can be attached to the base unit in three different positions allowing for the add-on module connector to be pointed in any of three different orientations in space. This "three degrees" of freedom orientation allow for better alignment with external or internal interconnects or cables and easier manipulation of the interconnect device resulting in optimum cable management and routing.

Using a combination of Base Unit, Add-on Module and Universal Mounting Bracket allows for the removal and replacement of devices during upgrades without the need to interrupt the existing network wiring within the NID and allows hook up outside of the NID, providing easier access for torque tools, wrenches, connectors, and the like.

The standard RJ45 test connection; widely used in the industry for network trouble shooting, may be provided at the Base Unit.

According to one aspect of the present invention, modular splitter construction provides a service provider with the ability to easily field test signal enhancements, various noise filtration schemes, premise wiring configurations and the like during installation allowing system optimization on a per installed premise basis.

BRIEF DESCRIPTION OF THE DRAWINGS

The aspects of the present invention will become more apparent by describing in detail examples of embodiments thereof with reference to the accompanying drawings, in which.

DETAILED DESCRIPTION

The present invention will now be described more fully with reference to the accompanying drawings, in which examples of embodiments of the invention are shown. The invention may, however, be embodied in many different forms and should not be construed as being limited to the embodiments set forth therein; rather, these examples of embodiments are provided so that this disclosure will be thorough and complete, and will fully convey the concept of the invention to those skilled in the art.

Figure 1:
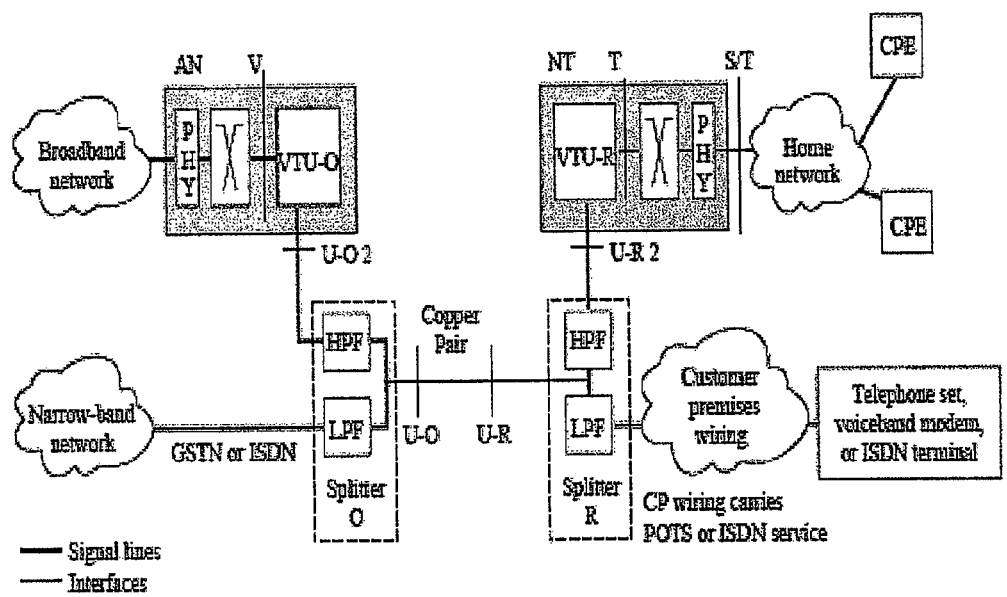
FIG. 1 is a generic application reference model according to ITU-T G.993.2 (February 2006) section 5, subsection 5.4 for remote deployment with splitter showing data service with underlying POTS service.

FIG. 1 is a generic application reference model according to ITU-T G.993.2 (February 2006) section 5, subsection 5.4 for remote deployment with splitter showing data service with underlying POTS service. Data service only and data service with underlying ISDN service application reference models are not shown. Although the diagram refers to the VDSL2 transceiver unit (VTU), a more generic xDSL expression is used herein to encompass all DSL schemes.

Of particular interest is the block labeled "Splitter R" which inter-connects the Central Office "Copper Pair" to the "Customer premise wiring" through a Low Pass Filter (LPF) and the VTU-R (where R is remote) through a High Pass Filter (HPF). The VTU-R is also commonly called the Modem at the customer premise. Designations U-O, U-R, U-R2 refer to interfaces that are defined within the specification. Section 14 "Electrical requirements", and in particular subsection 14.2 "Service Splitters" is left up to developers to further define.

Figure 3:
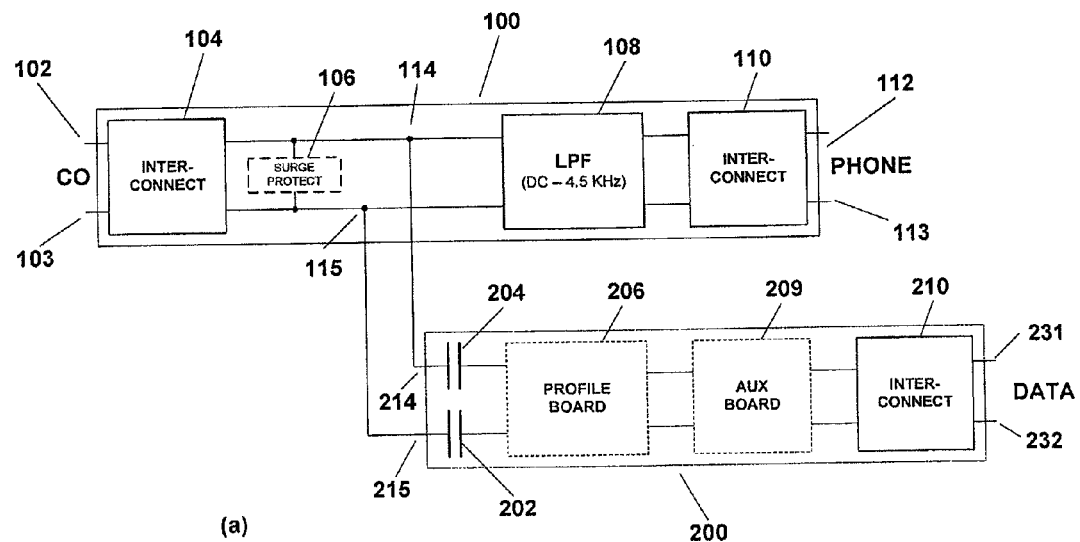
FIG. 3 shows the critical partitioning of the ITU-T reference model that facilitates dividing the system without degradation while providing the required application development, circuit and physical mechanical flexibility according to exemplary embodiments of the present invention. A differential configuration is shown in (a) and a single-ended configuration is shown in (b) where "CO" is the Central Office outside plant unshielded twisted pair (UTP), coaxial cable (COAX) or other media entering the premise; "Phone" represents the voice circuit media or wiring within the premise; and "DATA" is associated with the xDSL premise media or wiring. It is this partition technique, while maintaining high signal integrity and performance, that allows for modularization and a broad development flexibility.
Figure 3:
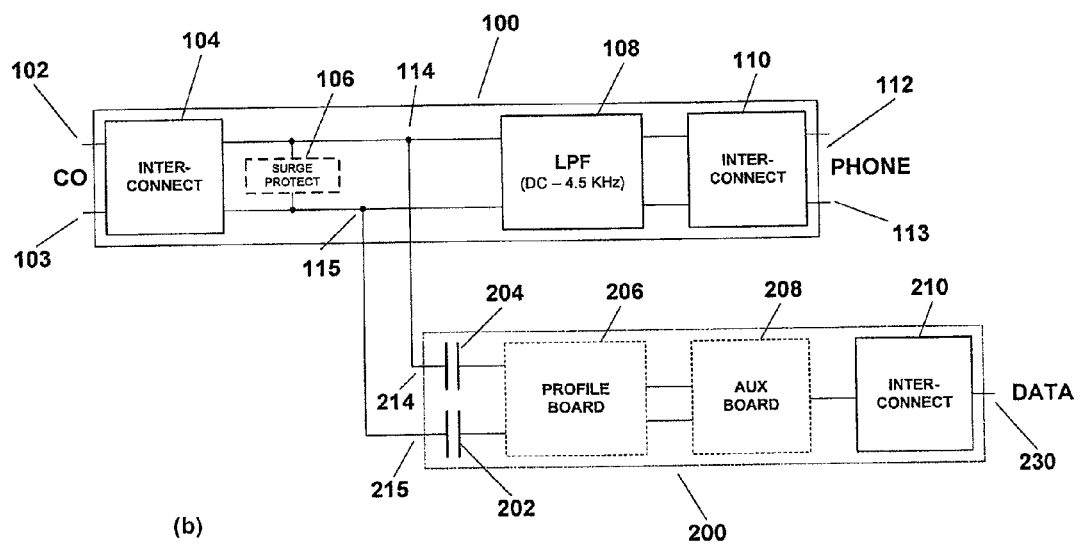

By combining Radio Frequency (RF) design techniques with specially built very low frequency (VLF) through high frequency (HF) Vector Network Analyzer (VNA) test and measurement equipment, it has been discovered that the ITU-T xDSL reference models can be partitioned as shown in FIGS. 3 (*a*) and (*b*) without loss of performance or system degradation. If careful consideration of complex impedances over the full frequency band of interest is taken into account, and modem mixed-mode scattering parameter methodologies (M-M S-Par) are employed, full and complete sets of parametric data can be derived for component, board, module and system elements. This comprehensive parametric data is, in turn, used to perform very accurate functional synthesis, circuit design and full system analysis. In accordance with one exemplary embodiment, a particular reference model partitioning could maintain optimum performance while providing a great deal of electrical and mechanical flexibility in development of xDSL splitter-filtering, signal enhancement, mechanical design, physical configuration, and interconnectivity.

Figure 2:
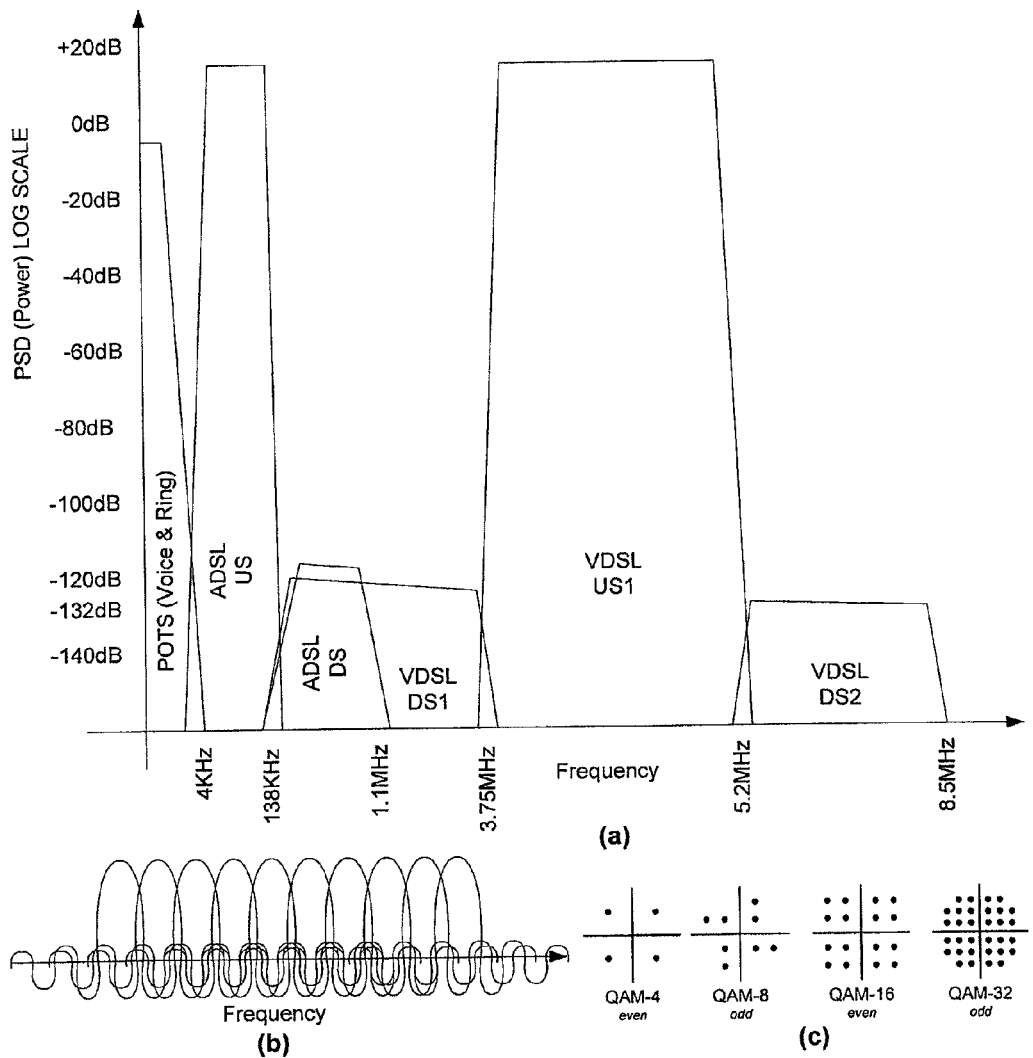
FIG. 2 outlines a related art premise side simplified signal spectral plot of the duplex xDSL signal for typical VDSL2 8a profile (a), a small representative section of the orthogonal channel structure Discrete Multi Tone (DMT) modulation scheme (b), and diagrams of four possible quadrature modulation constellations (c) that each of the possible 512 DMT channels might employ based upon their specific signal to noise ratio (SNR). A full description of all profile DMT structures is found in ITU-T G.993.2.

The design partition complexity of the xDSL bi-directional signal makeup of the example VDSL2 Profile 8a is illustrated in FIG. 2. Briefly the frequency band is sub-divided into a voice band, uplink (US, US1) bands and downlink (DS, DS1, DS2) bands where both ADSL and VDSL2 channels may be present as shown in the Power Spectral Density (PDS) versus Frequency plot in FIG. 2 (*a*). The system uses an orthogonal channel structure presented in FIG. 2 (*b*) to save bandwidth and employs quadrature amplitude modulation (QAM) with up to 32 bits per carrier as outlined in constellation diagrams (c). Theoretically, up to 512 channels can be filled with up to 32 bits per channel. Each channel bit fill is known as a "bin," with the maximum fill depending on the individual channel signal to noise ratio (SNR). This feature distinguishes xDSL Discrete Multi Tone (DMT) modulation from Orthogonal Frequency Division Multiplexing (OFDM) modulation which employs only a fixed Bin. DMT requires critical signal levels, demanding phase preservation and very good noise performance to ensure optimum system operation.

FIGS. 3 (a) and (b) show simplified diagrams for optimized partitioning of the xDSL reference model according to an exemplary embodiment of the present invention. This partitioning includes PSTN twisted pair interconnect terminal 104, surge protection device 106, xDSL profile filter 206, low pass voice band filter 108, data interconnect 210, POTS interconnect 110, matching capacitors 202/204 and Auxiliary (AUX) Board 209.

As an example of this partition, consider in FIG. 3 (a); where the add-on module 200 uses Aux Board 209 with a straight-through connection; thus profile filter 206 output is balanced and interconnect 210 would provide differential interconnects 231 and 232. In FIG. 3 (b) the Aux Board 208 consists of a balanced to unbalanced conversion device (Balun) such that interconnect 210 provides a single-ended interconnect 230. As a further example; consider a profile board 206 providing a high pass filter (HPF) function with cut off frequency of 25 KHz followed by an Aux Board 208 containing a Balun. Although technically complex to develop, these straight forward examples emphasize the valuable features of this partitioning approach. The voice filter and xDSL filter can now be co-located and provide independent functions which, in turn, separate the base unit from the add-on module, allowing a great deal of flexibility and savings in electrical and mechanical development, manufacture, distribution, warehousing, system deployment and re-configuration.

Figure 4:
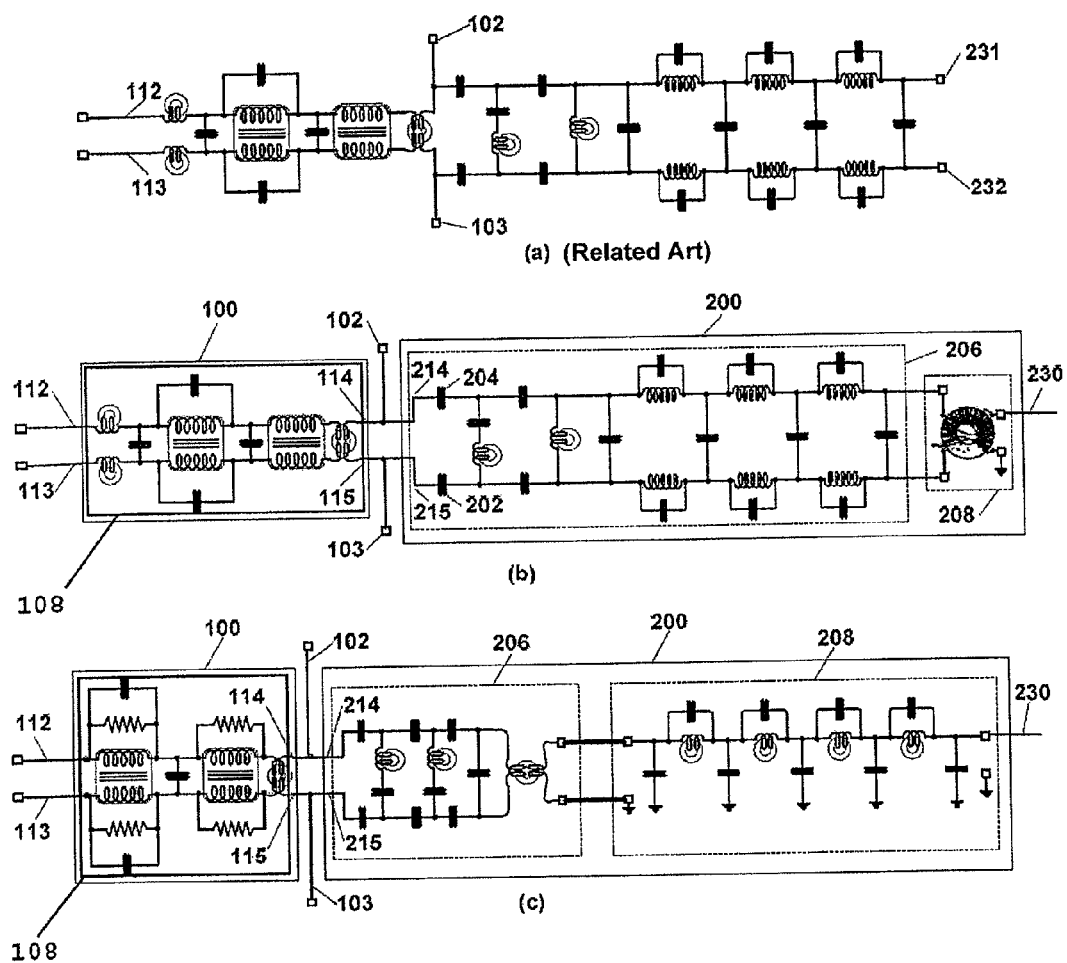
FIG. 4 includes three (3) example simplified schematics of passive element differential and single-ended splitter-filter circuits according to exemplary embodiments of the present invention.

In FIGS. 4 (a)-(c), several examples of passive circuit configurations of the splitter-filter and splitter-filter-balun are shown. FIG. 4(a) presents the schematic of a high performance balanced xDSL profile filter topology with differential interconnect without partitioning. UTP POTS xDSL signal interconnects at 102/103 and is internally connected with the voice filter and xDSL data profile filter. This configuration is typical of related art devices.

FIG. 4 includes three (3) example simplified schematics of passive element differential and single-ended splitter-filter circuits according to exemplary embodiments of the present invention. A typical fixed configuration, dual wide NID slot, single fixed housing, differential splitter-filter is shown in (a); the same circuit topology is shown in (b), however the circuit is partitioned and includes an added balanced to unbalanced (Balun) circuit transformation device providing single-ended interconnect. A third partitioned topology is shown in (c) where the xDSL filter interconnect is single-ended.

One example of partitioning is illustrated in FIG. 4 (b) where CO POTS interconnects 102/103 with the base unit 100, housing the voice filter 108, at 114/115 and interconnects with add-on module 200 at 214/215. Internal to the add-on module 200 is an xDSL Profile Board 206 and balun Aux Board 208 with single-ended data interconnect 230. Another high performance splitter circuit with similar voice filtering 108 housed in the base unit 100 is shown in FIG. 4 (c), however, this xDSL profile filter uses a different topology with differing characteristics where a balanced first filter section 206 is combined with a single-ended second filter section 208 providing a single-ended interconnect 230.

The splitter circuit configuration in an exemplary embodiment of the present invention is designed to support a functional partition whereby a main assembly base unit supports functions that are common to all xDSL profile configurations and an add-on module further supports functions that are specific to particular xDSL profiles and enhancements. Individual and separate interface and interconnect functions are also supported.

In an exemplary embodiment, functions that are common to all xDSL profile configurations include the PSTN twisted pair interconnect 104 with terminals 102/103; a surge protection device 106, if required; a low pass voice band filter 108, and a POTS wiring interconnect 110 and terminals 112/113.

One exemplary embodiment of the present invention includes a passive xDSL splitter-filter assembly 200 including an xDSL Profile Board 206, data Interconnect type 210 with physical interconnect means that are plugged onto the common base unit 100 assembly to form a complete splitter. This splitter circuit can contain any combination of profile, interface, and interconnect, as required by the application or installation. For example, if a premise contained only usable twisted pair wire or only usable coaxial cable, during installation the technician could choose an add-on module with the appropriate interconnect, or, if the current distribution media in use were to become non-operable, only an add-on module Interconnect 210 change would be required to interface with a different distribution media type. A further example, if a premise were located some distance from the CO, a receive signal amplifier splitter-filter combination add-on module 200 could be deployed in place of the original splitter-filter. Or, if a local radio station or other source were causing excessive interference within the xDSL band, a notch filter Add-on Module might be deployed at the time of the installation, or, as an upgrade or repair.

FIGS. 5(a) and (b) include the use of active components to achieve xDSL profile filtering and other performance enhancements according to another exemplary embodiment of the present invention. The integrated active circuit and support components reside within the add-on module 200 and make use of the module interconnects 104 via interconnects 114/214, 115/215 and 210.

Figure 5:
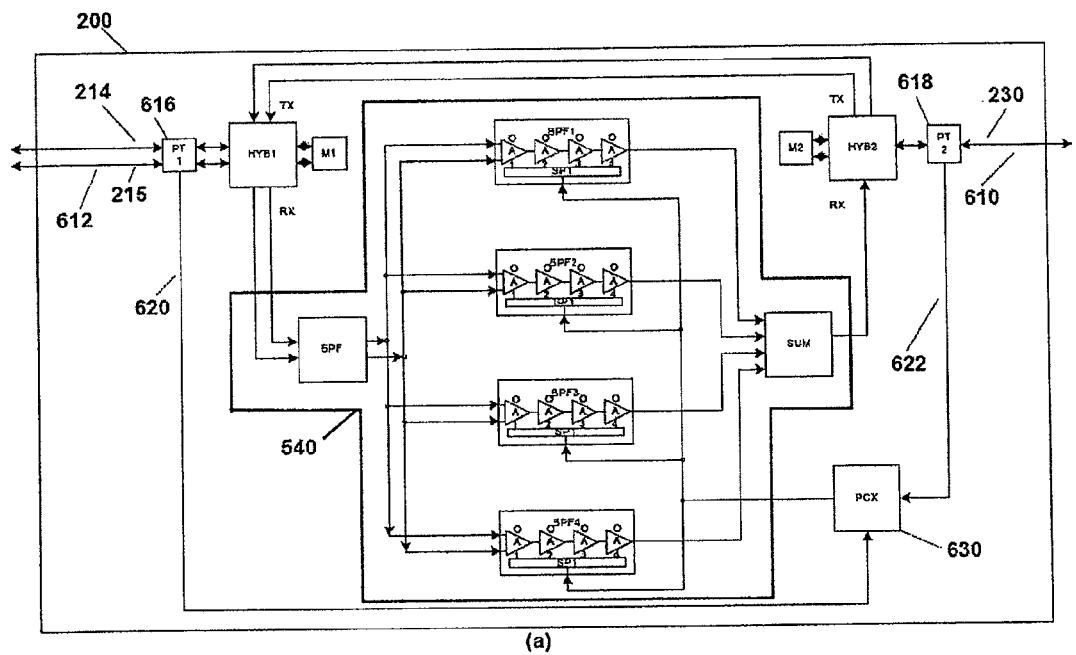
FIG. 5 shows detailed block diagrams outlining two (2) of the many active filter and signal enhancement circuits that are deployed within the add-on module according to an exemplary embodiment of the present invention.
Figure 5:
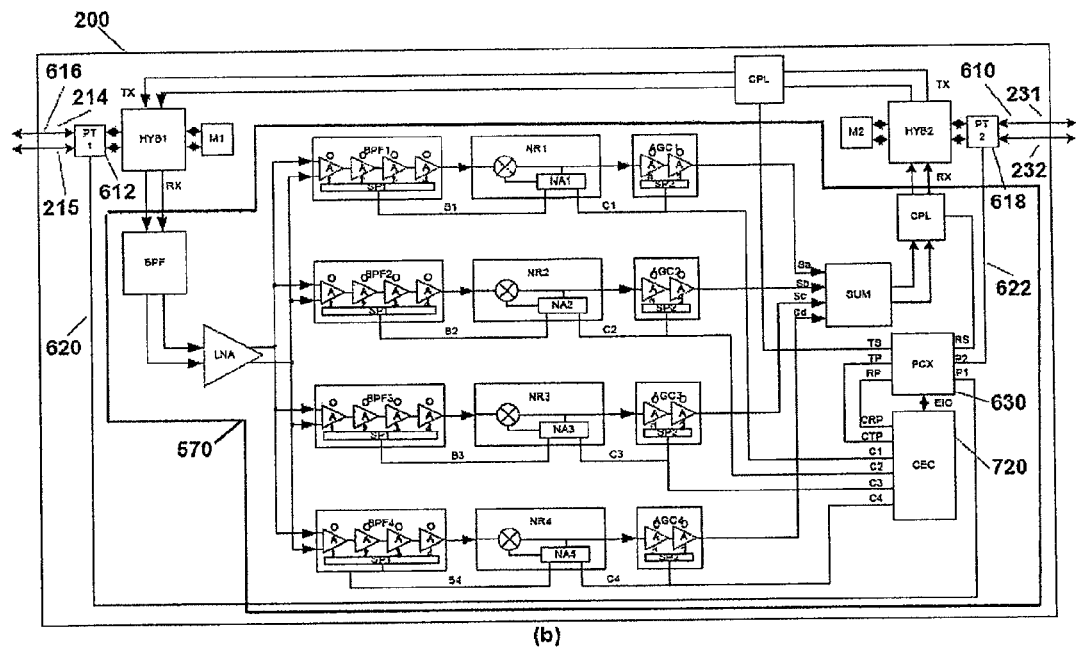

FIG. 5 (a) is an integrated active xDSL profile filter 540 with a means of receiving external power either from the CO POTS interconnect 104/620 or through premise wiring interconnect 210/610/622 by employing on-board Power Taps and selectively routing the power source by an on-board switch 630. Power is currently provided on the POTS system along with the voice and xDSL data signal through interconnects 214 and 215. Premises side power is made available by adding a power source within the Premises and super-imposing a voltage 610 onto the xDSL premises data signal wiring and interconnect 230.

FIG. 5 (b) shows an integrated active xDSL profile filter with noise mitigation and xDSL signal gain boost features 570. This circuit is powered from the CO or the Premises using similar methods as those previously described for FIG. 5 (a). Additional features include remote programming and monitoring capability, enhanced internal power control and transmit power monitoring.

The circuits shown in FIGS. 4 (a)-(c) employ passive components and, as such, do not require an external power source and are not capable of electronic signal amplification whereas the circuits of FIGS. 5 (a) and (b) employ integrated active components and, as such, do require an external power source and are capable of electronic signal amplification and other sophisticated xDSL signal manipulations.

One exemplary embodiment of the present invention involves active circuitry, external powering, location of the xDSL add-on module 200 remote from the base unit 100 while interconnecting and programming the same through any technically appropriate means. The method of attachment and interconnection of the module onto the assembly or remotely interconnecting the assembly to the module without degradation of performance is accomplished by ensuring proper match conditions between the devices while considering the medium, for example coaxial cable or balanced twisted pair wires, Ethernet cable, magnetic inductive coupling, optical coupling or electromagnetic radiation coupling.

Figure 6:
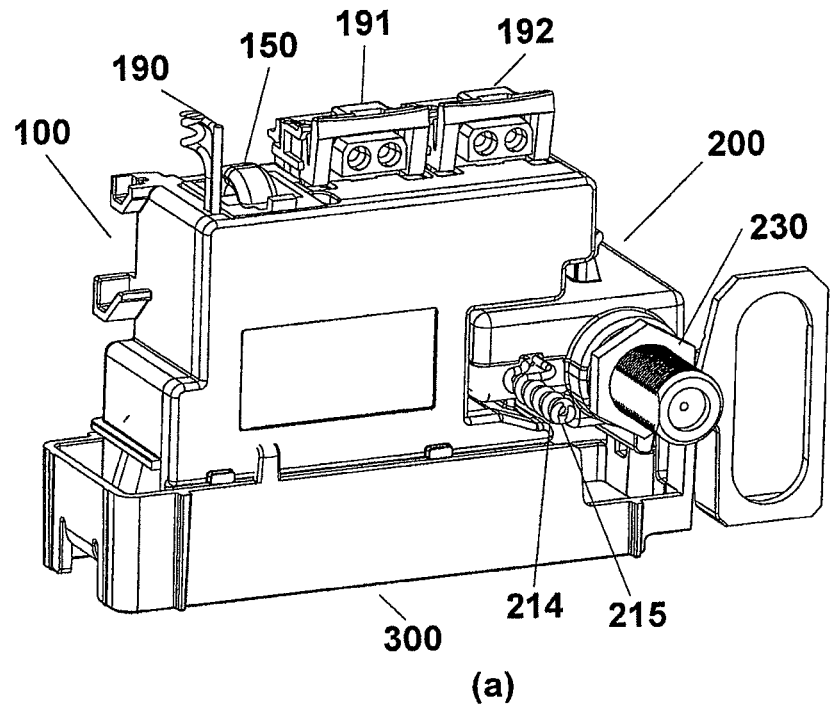
FIG. 6 is a physical integrated assembly of the base unit, add-on module and universal mounting bracket according to an exemplary embodiment of the present invention.
Figure 6:
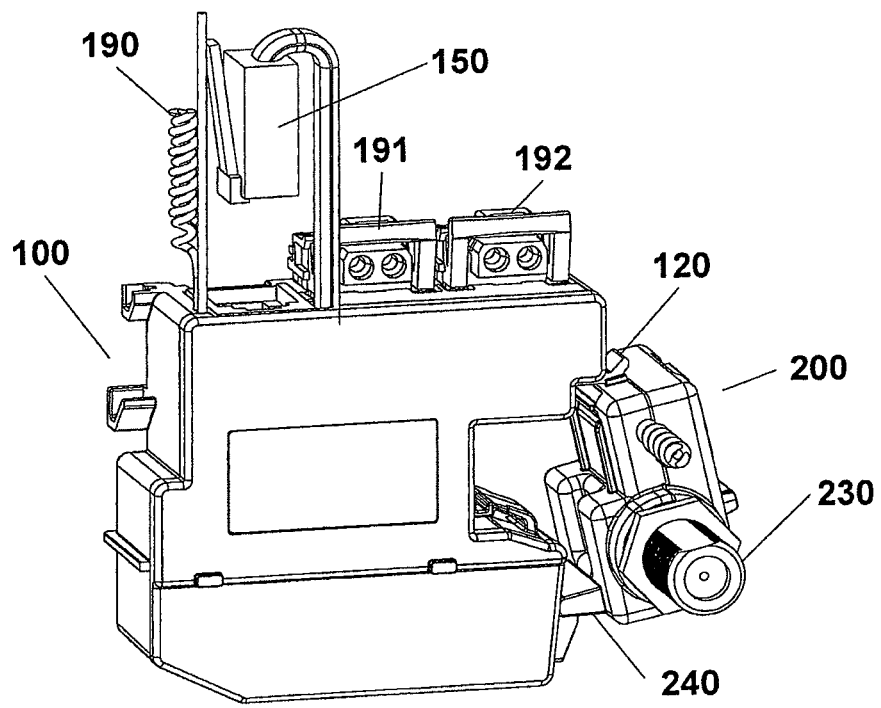

FIG. 6 (a) shows assembly of the base unit, add-on module and universal mounting bracket according to another exemplary embodiment of the present invention. This combined assembly, or parts thereof, have been successfully tested to properly fit and secure within these NID enclosures: AFL (Keptel) SNI-4300 w/K-footprint without recess; AFL (Keptel) SNI-4600 w/K-footprint without recess; Tyco/AFL (Keptel) SNI-4300 w/S-footprint—need to use Adapter; Tyco/AFL (Keptel) SNI-4600 w/S-footprint—using the bracket; Corning (Siecor) CAC 7300 (S-footprint)—using the bracket; Corning (Siecor) CAC 7600 (S-footprint)—using the bracket; Corning (Universal) UNI 3003—using the bracket; Corning (Universal) UNI 3006—using the bracket. The above NID group represents the vast majority of NID enclosures currently installed in the field.

FIGS. 6 (a) and (b) illustrate another exemplary embodiment, and include a base unit 100 with internal and external features that provide a means to mechanically and electrically connect the base unit 100 to the NID 400 enclosure and corresponding telephone network connections as well as the connections to the add-on module 200.

Figure 12:
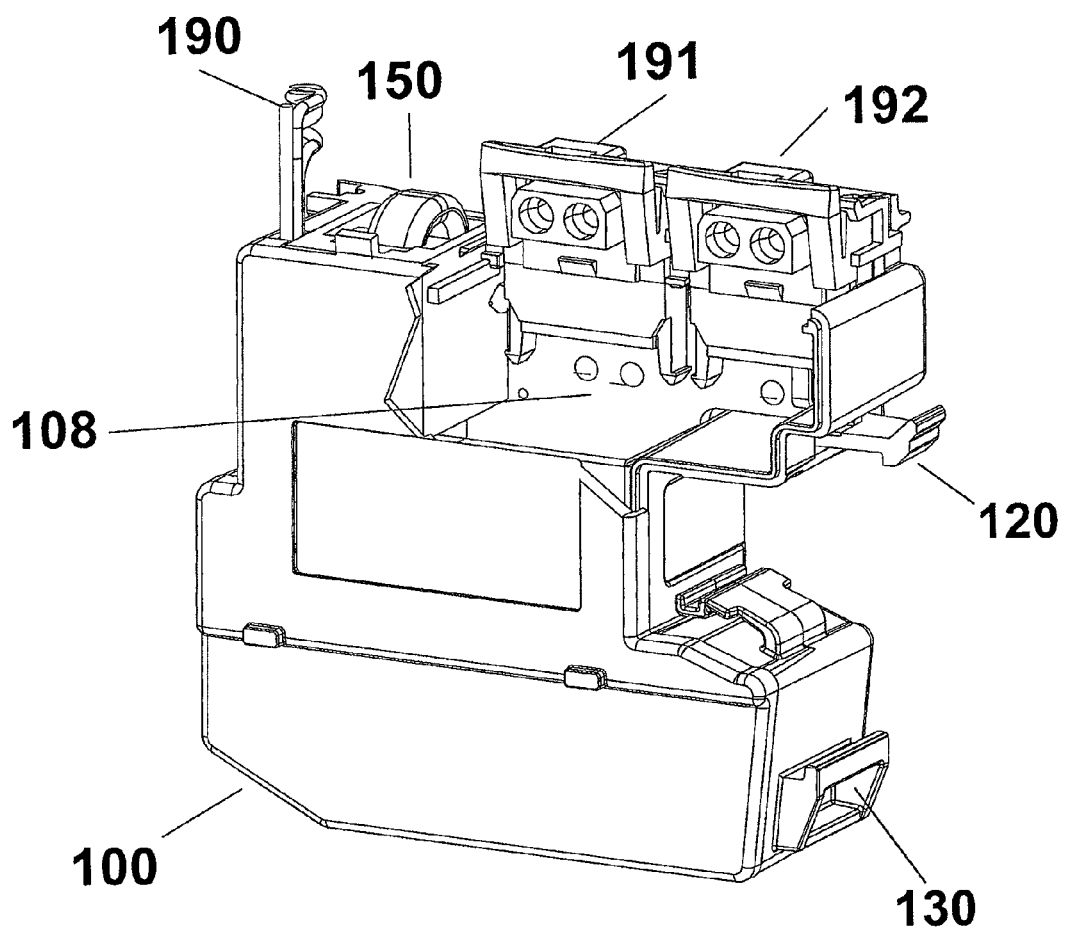
FIG. 12 provides a base unit cut-away left view exposing part of the internal circuit board assembly with differential insulation displacement connector attachment locations according to an exemplary embodiment of the present invention.

FIGS. 6-9 illustrate examples of embodiments of the present invention where features including the interconnects 102, 103 and 190 from the PCB 108 shown in FIG. 12 inside the base unit 100 that connects to the external network wiring present in the NID 400. Also present are one or more insulation displacing connectors (IDCs) 191 and 192 with openings 112, 113, 114 and 115 for interconnects from the add-on module 200 to electrically connect to the base unit 100. The base unit 100 includes an RJ cable 150 coming from inside the base unit 100 from the PCB 108, wherein the RJ cable 150 connects to the female RJ connector used for testing the base unit and the signal coming from the Central Office (CO).

Figure 9:
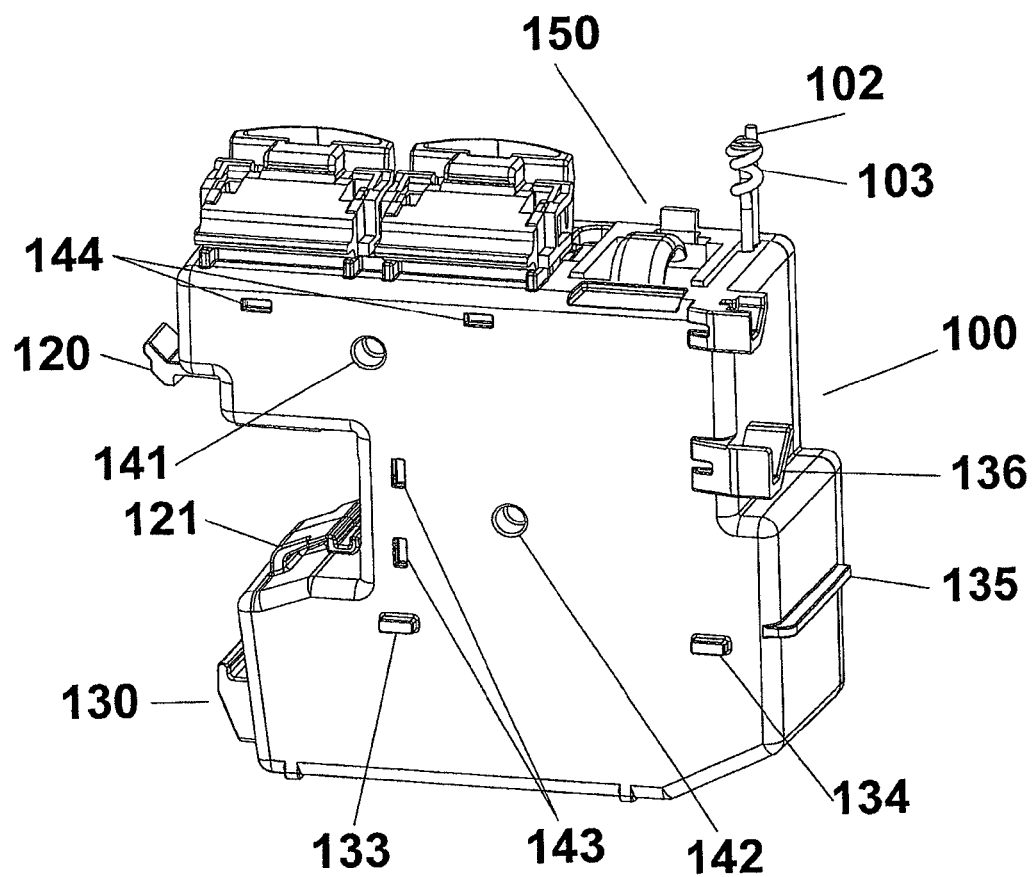
FIG. 9 is the base unit mechanical diagram right view according to an exemplary embodiment of the present invention.
Figure 10:
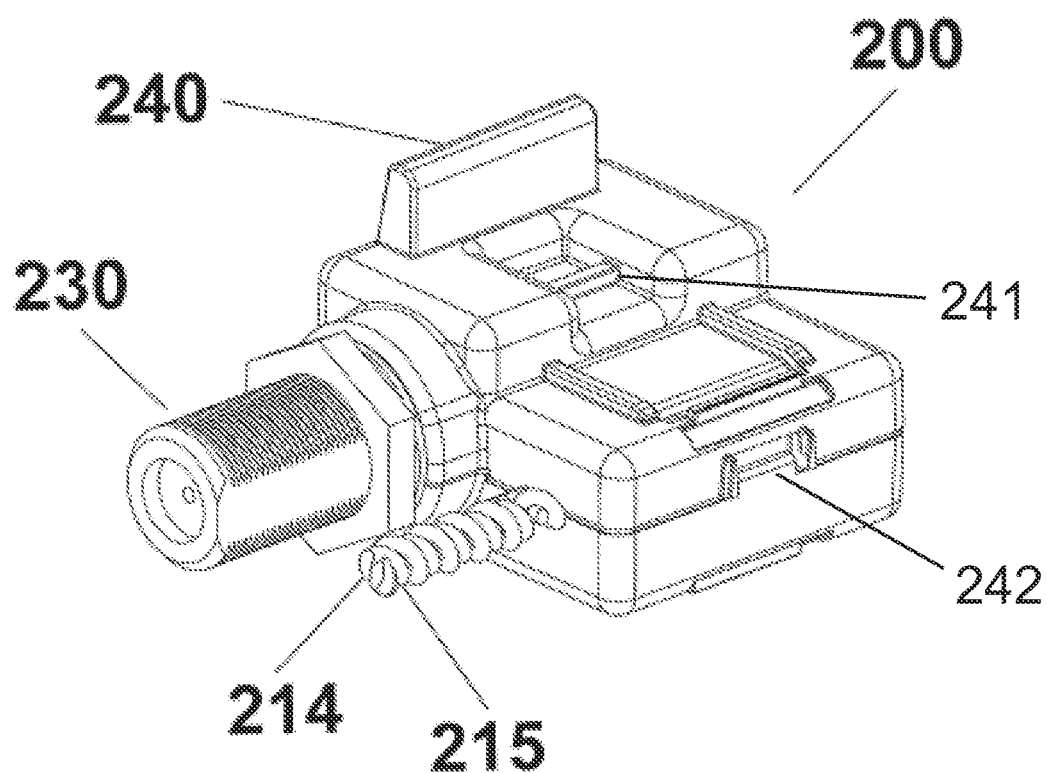
FIG. 10 illustrates the add-on module configured with a coaxial cable F-Connector premise wiring interconnect and UTP wire base unit interconnect according to an exemplary embodiment of the present invention.
Figure 13:
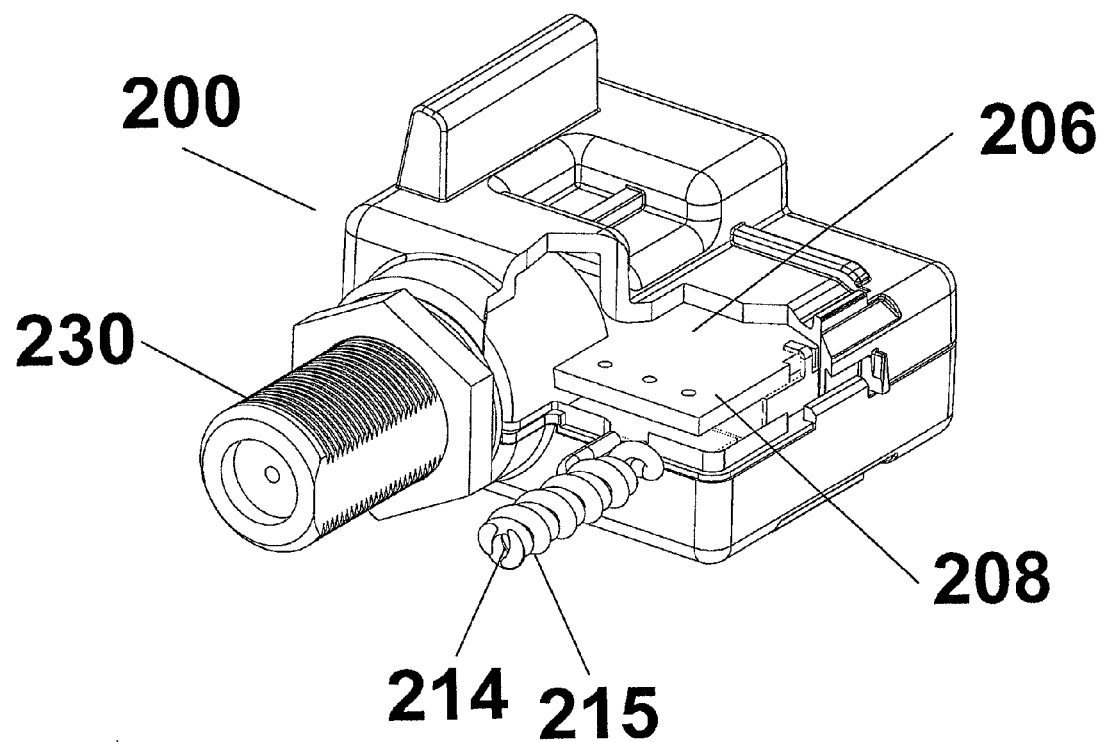
FIG. 13 provides a add-on module cut-away view revealing a two layer stacked circuit board assembly with UTP wire interconnect, F-Connector interconnect and balun shield housing according to an exemplary embodiment of the present invention.

An example of the add-on module 200 is illustrated in FIG. 10 and FIG. 13, and is mechanically mounted to the base unit 100 in any of three different orientations. In the first two mounting orientations the add-on module 200 is secured to the base unit 100 by snap fit hook 120 and 121 of the base unit 100. The difference being the two mountings is the orientation of the connector 230 with respect to the orientation of the base unit 100 inside the NID 400 enclosure. The base unit 100 is engineered to interface with features within the NID 400 so as to provide a way to mount the base unit 100 in many different NID 400 styles from multiple manufacturers. Some of these features are shown in FIG. 9.

For example, a receiving catch 130 of the base unit 100 engages a hook type feature common to the "K" style footprint NID 400 enclosures and rotates via an axis normal to the front plane of the base unit 100 and the base unit 100 is seated in the NID 400 until one or more attachment arms 136 of the base unit 100 body are secured and received by the mating interface features in the NID 400. Depending on the particular NID 400 into which the base unit 100 is installed, the orientation of the base unit 100 can be either as shown in FIG. 9 or it can be rotated 180 degrees about a vertical axis normal to the base of the NID 400 and installed into same or similar type features commonly known to anyone skilled in the art. When the latter mounting is used, the add-on module is rotated 180 degrees about the horizontal axis and is installed with the connector 230 pointing in the opposite direction when the add-on module is coupled to the hooks 120 and 121. In other words, in one exemplary embodiment, the add-on module 200 can be oriented to accommodate the various alignments of the base unit 100 within the NID 400. Add-on module 200 includes mating elements 241 and 242.

In one exemplary embodiment, the add-on module 200 can also be mounted on the side of the base unit 100 as shown in FIG. 6 (b) by engaging the mounting ear 240 on the add-on module 200 with the catch 130 on the base unit 100 and rotating it counter clockwise (CCW) until the add-on module snaps into position with the hook 120 on the base unit 100. The add-on module 200 includes external interconnects 214 and 215, as shown in FIG. 13, coming from PCB 206 to make electrical connections with the base unit 100.

Figure 14:
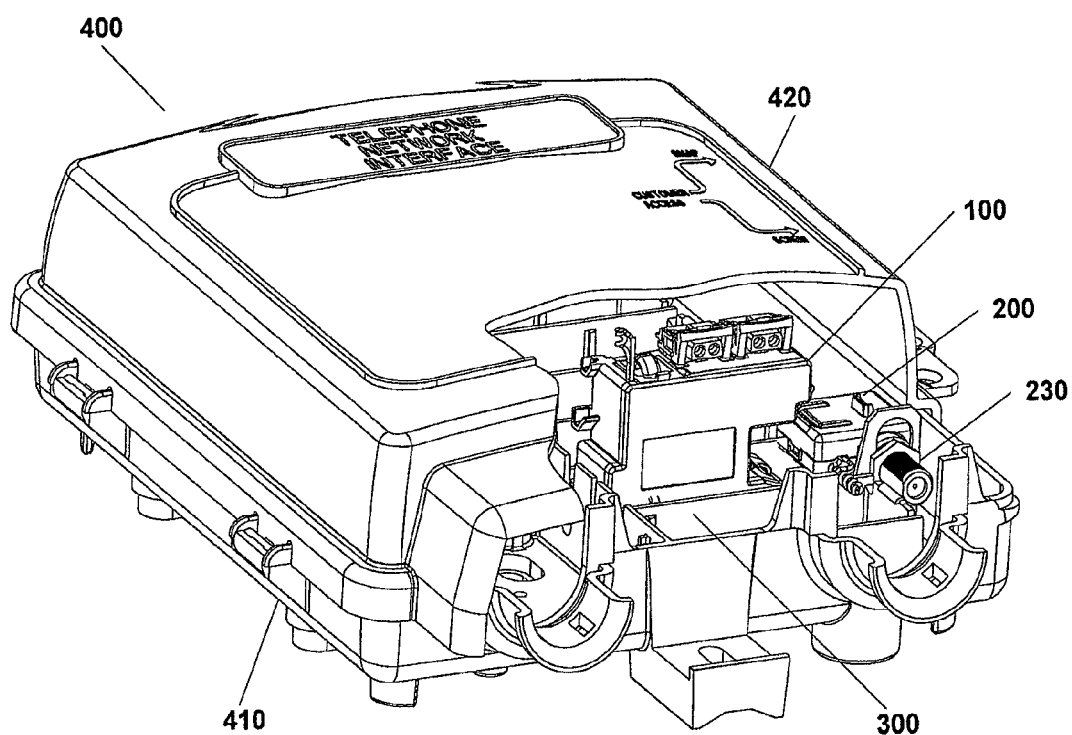
FIG. 14 illustrates a typical NID enclosure single line slot application with cut-away view to show installed base unit, add-on module and universal mounting bracket according to an exemplary embodiment of the present invention.
Figure 15:
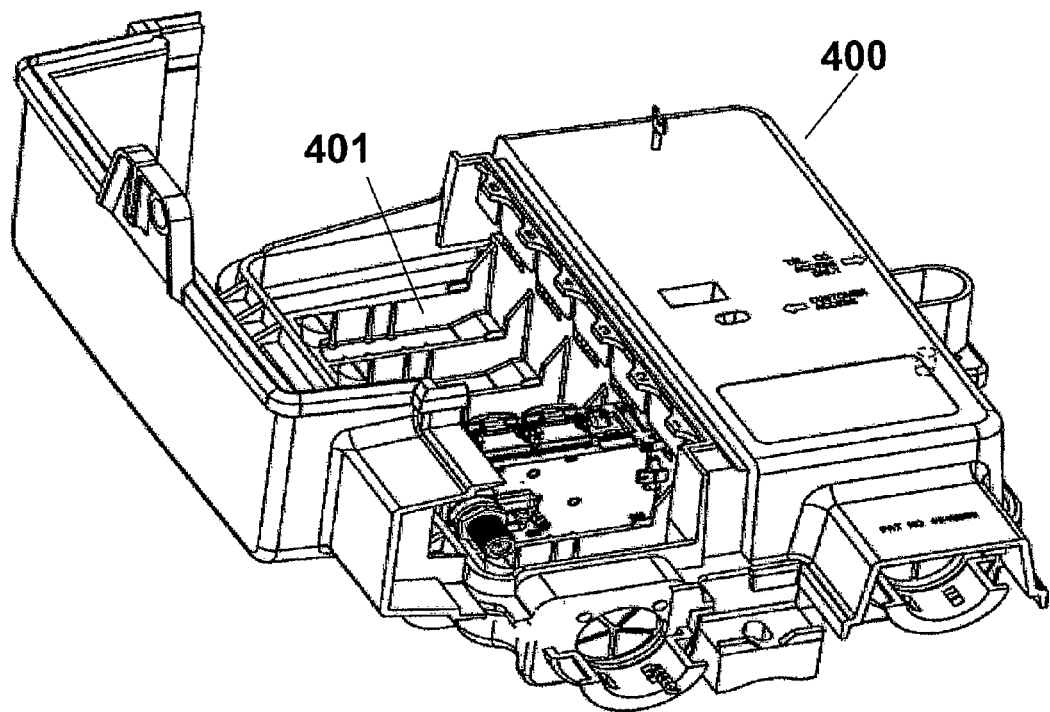
FIG. 15 illustrates another view of a typical NID enclosure single line slot application with cut-away view to show installed base unit, add-on module and universal mounting bracket according to an exemplary embodiment of the present invention.

In one exemplary embodiment, the base unit 100 also includes anti-rotation features 143 and 144 along with mounting bosses 141 and 142 that provide a way to connect auxiliary mounting brackets and devices, which can be used to mount optional hardware as needed for present and future requirements. The base unit 100 also includes support features 131, 132, 133 and 134, shown in FIG. 8 and FIG. 9, that are used when mounting the base unit 100 with the universal mounting bracket 300 shown in FIG. 11. In one exemplary embodiment, the base unit 100 can also be installed into an "S" style NID 400 by the addition of the universal mounting bracket 300 shown in FIGS. 14 and 15, and if required by field technicians it may also be used in the Universal style NID 400 enclosure.

Figure 11:
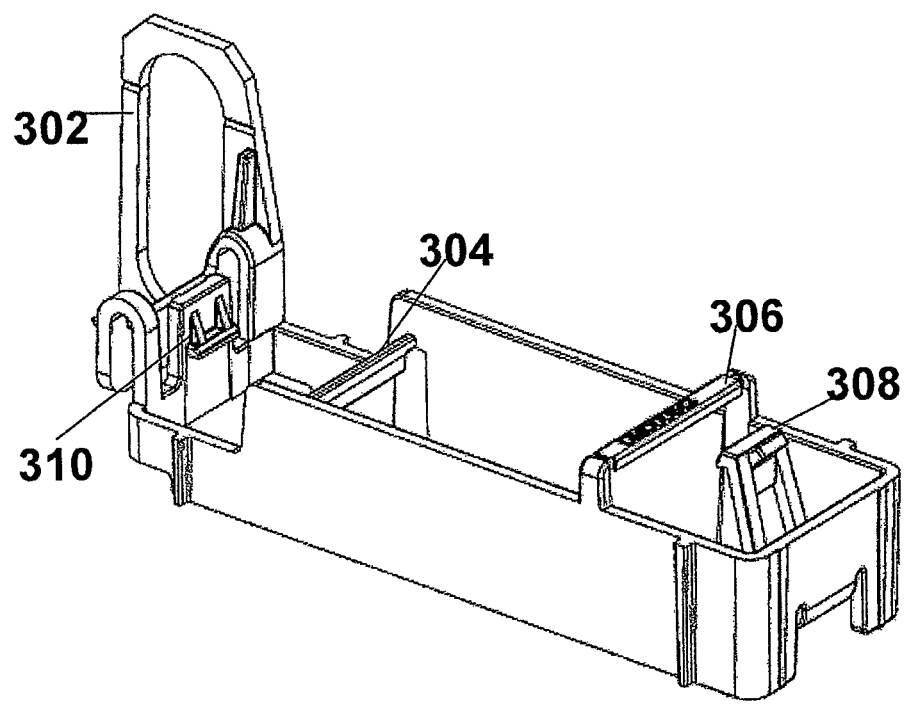
FIG. 11 illustrates the universal mounting bracket with all break-away components in place according to an exemplary embodiment of the present invention.

An example of a universal mounting bracket 300 shown in FIG. 11 can be used to mount base unit 100 and add-on module 200 within a single line space of the NID 400. The universal mounting bracket 300 is secured within the NID by, for example, protrusion like features with undercut formed heads commonly referred to as snap fits.

There are a multiple arrangements in which the base unit 100 may be mounted into the universal mounting bracket 300. Various arrangements may be accomplished by removing one or more cross bars 304 and 306. Cross bars 304 and 306 may be removed, for example, using tools or by hand. Various arrangements are necessary to provide flexibility when positioning the base unit 100 (or base unit 100 and the mounting bracket 300) within the NID. Typically, there are two compartments on a NID, Telco side and Customer side. The network module is usually installed on the Customer side. However, some suppliers have the Customer side on the left, some on the right. Thus, the flexibility to orient the network module allows the network module to be installed in various styles of NIDs.

FIG. 6 (a) shows one example of an arrangement where the base unit 100 is positioned in the universal mounting bracket 300 by removing the cross bar link 306. The catch feature 130 of the base unit 100 is engaged with the bar 304 of the universal mounting bracket 300. The base unit 100 is then rotated counter clockwise, away from the vertical flange 302 of the universal mounting bracket 200 until rib feature 135 of the base unit 100 snaps into position under the snap finger hook 308 of the universal mounting bracket 300.

Figure 7:
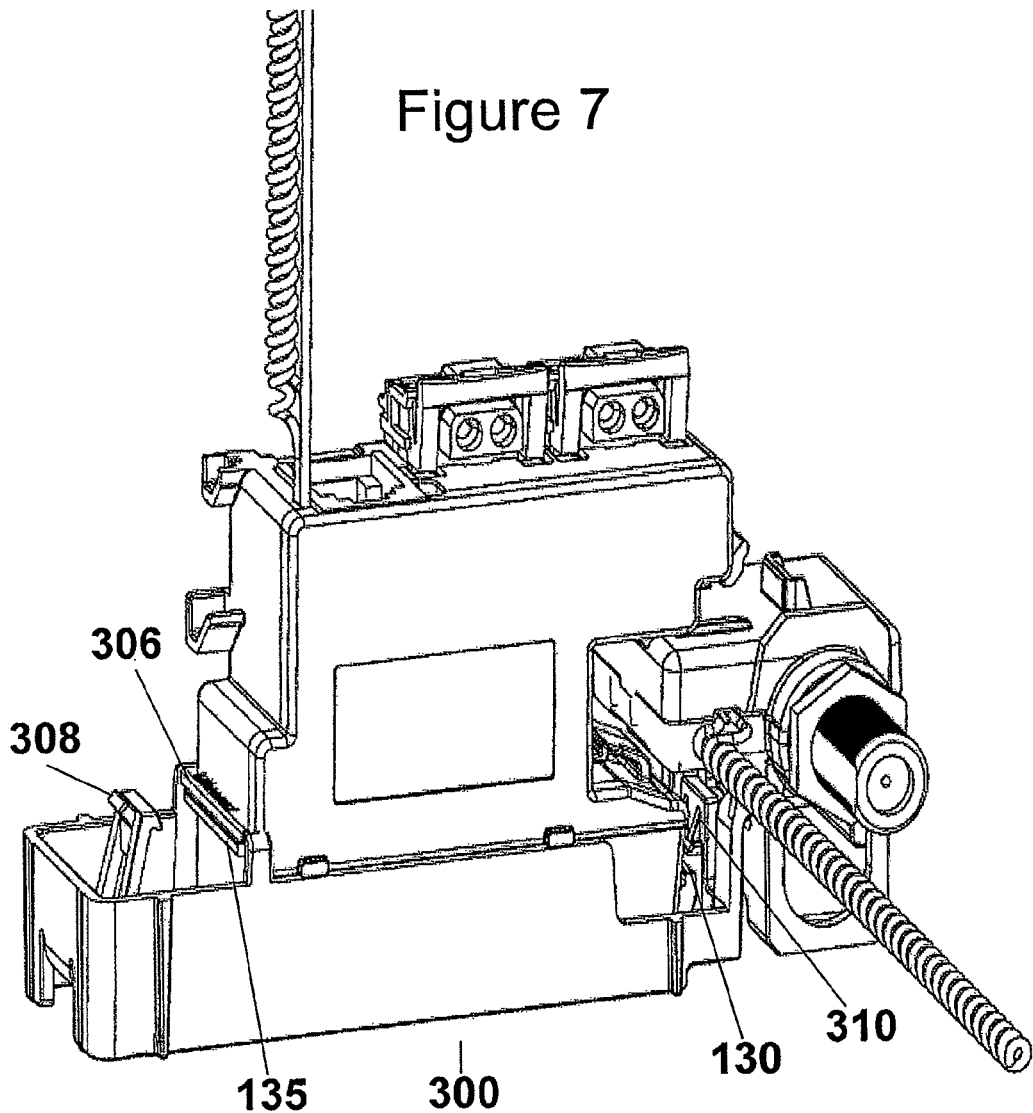
FIG. 7 shows a physical integrated assembly of the base unit, add-on module and universal mounting bracket according to another exemplary embodiment of the present invention.
Figure 8:
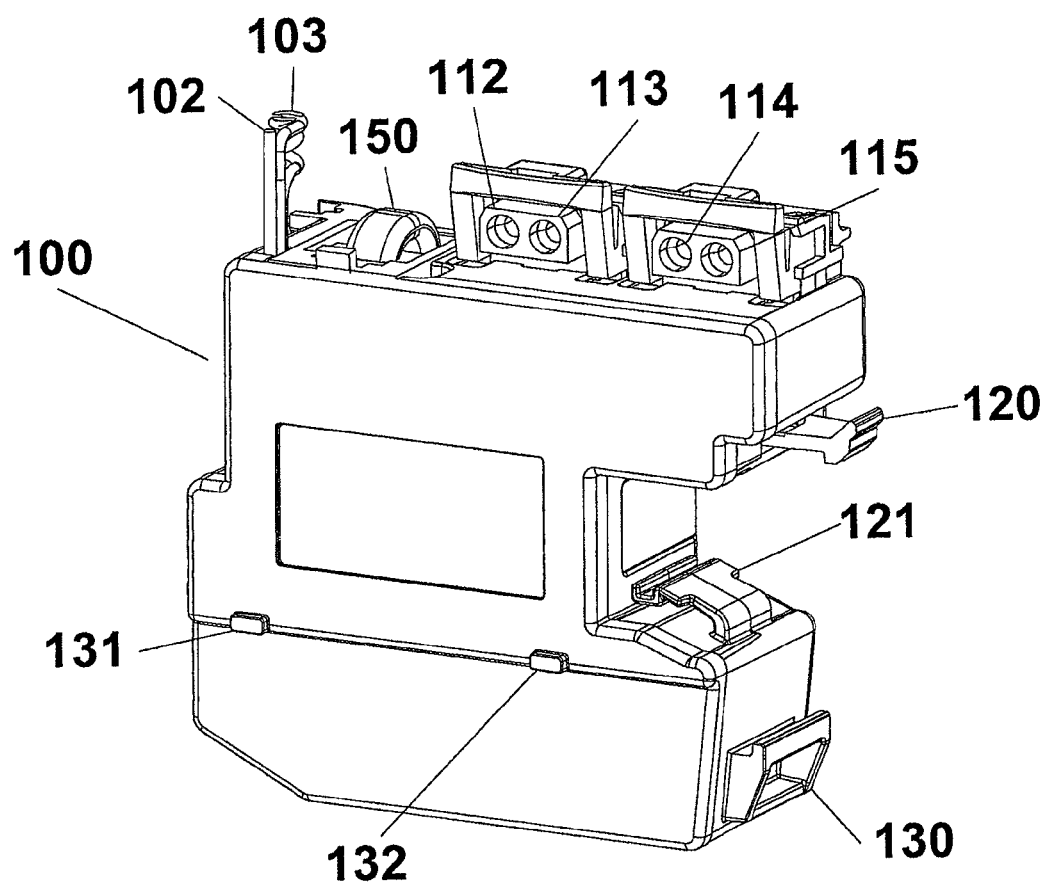
FIG. 8 shows the base unit mechanical diagram left view according to an exemplary embodiment of the present invention.

FIG. 7 illustrates another exemplary embodiment, wherein the base unit 100 may be arranged within the universal mounting bracket 300 in a second position by removing cross bar 304. In this arrangement, catch piece 135 of the base unit 100 is with hooks underneath the crossbar 306. The base unit 100 is then rotated counter clockwise into the universal mounting bracket 300 until catch feature 130 snaps into position under snap-finger 310 securing the base unit 100 in place. These two arrangements of the base unit 100 within the universal mounting bracket 300 position the base unit 100 in 5 locations from left to right inside the NID 400, and provide options for the field technician to facilitate the installation of the coax cable connection. For example, different arrangements may be needed when clearing modules within the NID 400 when there is limited access is limited because of other adjacent modules also within the NID 400, or if the case 410 and cover 420 generate geometry constraints.

When installing the base unit 100 into the universal bracket 300 as discussed above, the add-on module 200 may be attached to the base unit 100. However, in one exemplary embodiment, the add-on module 200 may be detached from the base unit 100 and independently mounted into the universal mounting bracket 300. For example, the add-on module 200 may be detached from the base unit 100 in order to vertically adjust the position of the add-on module 200 with respect to the base unit 100. Such a vertical adjustment of the add-on unit 200 may be needed when using an F-connector 230, or when clearing other modules or devices within the NID 400, but is not limited to these reasons.

To facilitate attaching of the add-on module 200, the universal mounting bracket 300 may contain a vertical flange 302 with an open slot as shown in FIG. 11. The connector 230 may be inserted into the flange 302 to allow the add-on module 200, for example, to be coupled with cable and/or wiring inside of the NID 400. The add-on module 200 may be further secured with a jam nut supplied as part of the add-on module 200 or left loose to maximize cable routing options within the NID 400 in order to minimize bend radius attenuation of the fiber optic cable.

The vertical flange 302 of the universal mounting bracket 300 may also be detached form the universal bracket 300. Detaching the flange 302 may be performed for numerous reasons, such as, for example, providing mobility to field technicians when faced with space constraints. Likewise, flange 302 may also include a breakaway feature at the top which can be removed, for example, to install coax cable to the add-on module 200 outside of the NID 400.

The universal mounting bracket 300 may contain holes, additional mounting brackets, or provide strain relief of any wiring or cables coming from or to the base unit 100, the add-on module 200, or the combination of the two. For example, such modifications may be needed to mount additional devices or to facilitate network connection installations.

Numerous modifications may be made to the examples of embodiments of the present invention discussed above without departing from the spirit and scope of the present invention as defined by the following claims.

What is claimed is:

1. A network module, the module comprising:
a base unit, wherein the base unit comprises at least one mating element that couples to a corresponding mating element of a network interface device, and the base unit comprises electronics which comprise a splitter and a voice band filter, the voice band filter including a low pass filter;
a plurality of connector elements provided on the base unit that couple to an add-on module; and
the add-on module, wherein the add-on module comprises a plurality of mating elements corresponding to the plurality of connector elements of the base unit, the add-on module comprises electronics which comprise a profile filter, the profile filter including a high pass filter,
wherein the base unit is configured to interface with the add-on module and wherein the base unit is electrically connected to the add-on module, and
wherein the add-on module is configured to mechanically mount to the base unit in a plurality of operable orientations with respect to the base unit so that an electrical connector of the add-on module is able to point in a plurality of directions in space.

2. The network module of claim 1, wherein the network module occupies a single line space in the network interface device.

3. The network module of claim 1, wherein the base unit includes a cavity corresponding at least partially to the add-on module.

4. The network module of claim 1, wherein the base unit mating element is a receiving catch for mating with a corresponding hook of the network interface device.

5. The network module of claim 1, wherein the base unit is configured to couple to the network interface device in at least two orientations.

6. The network module of claim 1, further comprising a universal mounting bracket that connects the base unit to the network interface device.

7. The network module of claim 1, wherein the base module includes an interface for mounting additional components.

8. The network module of claim 1, wherein the electronics of the base unit support functions common to all xDSL profile configurations.

9. The network module of claim 1, wherein the electronics of the add-on module support functions specific to particular xDSL profiles.

10. The network module of claim 1, wherein the add-on module is interchangeable with a second add-on module.

11. The network module of claim 1, wherein the base unit and the add-on module provide independent functions.

12. The network module of claim 1, wherein the base unit is electrically connected to the add-on module using a insulation displacing connector.

13. The network module of claim 1, wherein the plurality of connector elements that couple to the add-on module comprise a first snap fit hook, a second snap fit hook and a receiving catch.

14. The network module of claim 13, wherein:
in a first operable orientation of the plurality of operable orientations the add-on module mechanically mounts to the base unit by the first snap fit hook and the second snap fit hook, and
in a second operable orientation of the plurality of operable orientations the add-on module mechanically mounts to the base unit by the first snap fit hook and the receiving catch.

15. The network module of claim 14, wherein:
in a third operable orientation of the plurality of operable orientations the add-on module mechanically mounts to the base unit by the first snap fit hook and the second snap fit hook such that the electrical connector of the add-on module points in a direction different from the first operable orientation with respect to the base unit.

16. The network module of claim 15, wherein:
in the third operable orientation, the electrical connector of the add-on module points in a direction opposite relative to the first operable orientation.

17. The network module of claim 1, wherein the add on module comprises a balanced to unbalanced conversion device such that the add-on module provides a single-ended interconnect.

* * * * *